Figure 1:
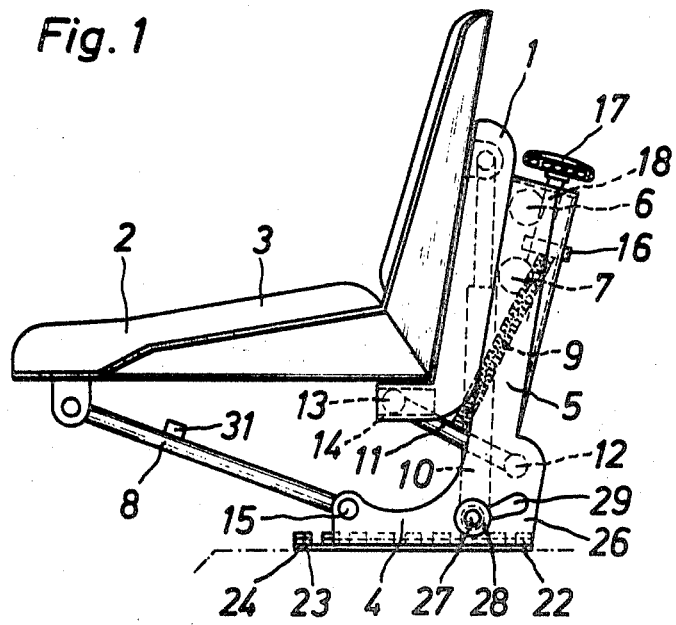

United States Patent

[11] 3,572,828

| [72] | Inventor | Wilhelm Lehner<br>Kummersbrucker-Strasse 6, Amberg<br>Oberpfalz, Germany |
|---|---|---|
| [21] | Appl. No. | 769,346 |
| [22] | Filed | Oct. 21, 1968 |
| [45] | Patented | Mar. 30, 1971 |
| [32] | Priority | Oct. 23, 1967 |
| [33] | | Germany |
| [31] | | P 16 30 736.1 |

[54] SEAT FOR VEHICLE PREFERABLY AGRICULTURAL VEHICLE
7 Claims, 4 Drawing Figs.

[52] U.S. Cl. .................................................. 297/308,
248/376, 248/399
[51] Int. Cl. ..................................................... A47c 3/22
[50] Field of Search......................................... 248/399,
400, 376, 429, 424, 430; 297/307, 308

[56] References Cited
UNITED STATES PATENTS

| 1,960,939 | 5/1934 | Hansen.......................... | 248/399 |
|---|---|---|---|
| 3,109,621 | 11/1963 | Simons et al................... | 248/399 |
| 3,268,200 | 8/1966 | Eicher............................ | 248/399 |
| 3,139,304 | 6/1964 | Lehner et al................... | 297/308 |
| 3,423,060 | 1/1969 | Fulling et al................... | 248/399 |

FOREIGN PATENTS

| 434,983 | 9/1935 | Great Britain................ | 248/429 |
|---|---|---|---|
| 405,958 | 7/1966 | Switzerland................... | 248/399 |

*Primary Examiner*—Edward C. Allen
*Attorney*—Fleit, Gripple & Jacobson

ABSTRACT: The seat comprises an L-shaped carrying frame for the seat upholstery and also an L-shaped mounting frame for connecting the seat to the vehicle. The mounting frame has a rear part which forms a track for rollers carried by the carrying frame. The seat also comprises a rocker arm, which is disposed under the seat proper, and a spring mounting consisting of resilient elements and a vibration damper. The rocker arm is pivoted to the mounting frame and to the seat proper at the forward ends thereof, and the spring mounting elements are connected at one end to the rear part of the mounting frame and at the other end to a short compensating rocker arm, which is pivoted at one end to the rear part of the mounting frame and at the other end by a roller to a track, which is provided on that part of the carrying frame which is near the seat proper.

PATENTED MAR 30 1971

3,572,828

SHEET 1 OF 2

INVENTOR
WILHELM LEHNER

BY
Stevens, Davis, Miller & Mosher
ATTORNEYS

SEAT FOR VEHICLE PREFERABLY AGRICULTURAL VEHICLE

This invention relates to a seat for a vehicle, preferably for an agricultural vehicle, such as a tractor which seat comprises an L-shaped carrying frame for the seat upholstery, an L-shaped mounting frame for connecting the seat to the vehicle, said mounting frame having a rear part which forms a track for rollers carried by the carrying frame, said seat also comprising a rocker arm, which is disposed under the seat proper, and a spring mounting consisting of resilient elements and a vibration damper.

In a known seat of this kind for a vehicle, the rocker arm is disposed under the bottom part of the carrying frame and pivoted at one end to the forward end of the carrying frame and at the other end to the mounting frame. The spring mounting elements are secured at one end to the rear part of the mounting frame and at the other end to the rear part of the carrying frame. At its end facing the rear part of the mounting frame, the rocker arm has an upwardly offset portion, which is pivoted to the mounting frame. That part of the carrying frame which is disposed near the seat proper extends to the forward end of the seat proper; the corresponding part of the mounting frame has almost the same length.

It is an object of the invention to provide for vehicles a seat which is of the kind described hereinbefore and which has a step-up spring mounting providing for an almost vertical spring-cushioned stroke and a progressive spring characteristic.

In a seat of the kind described hereinbefore for a vehicle, this object is accomplished according to the invention in that the rocker arm is pivoted to the mounting frame and to the seat proper at the forward ends thereof and the spring mounting elements are connected at one end to the rear part of the mounting frame and at the other end to a short compensating rocker arm, which is pivoted at one end to the rear part of the mounting frame and at the other end by a roller to a track, which is provided on that part of the carrying frame which is near the seat proper. The lower pivots of the rocker arms are preferably disposed in vertically spaced, horizontal planes.

In a development of the invention, the spring mounting elements are suspended at the rear part of the mounting frame from a preferably U-shaped support, which is mounted on a screw that is provided with a handle and serves for changing the weight setting, and said support has an intermediate portion which extends outwardly through gaps between offset wall sections of the box-shaped rear part of the mounting frame. The support thus prevents an inclination of the spring mounting and may also serve as a scale for the adjustment.

Also in accordance with the invention, the carrying frame is provided with pairs of differently spaced rollers of plastics material which are guided in tracks carried by the mounting frame.

To provide a seat having a small installation height and a large spring-cushioned stroke, the mounting frame is slidably guided by a rail in upright toothlike clips carried by a baseplate, and the mounting frame and the baseplate are clamped together like jaws of a vise by a rod, which strains the side members of the mounting frame and which is provided at one end with screw threads, to which a locking lever is secured.

To provide for a very small installation depth, the vibration absorber is pivoted at its lower end to the rod for locking the mounting frame and the baseplate. In the known seats for vehicles, two separate rods are provided for this purpose.

Figure 2:
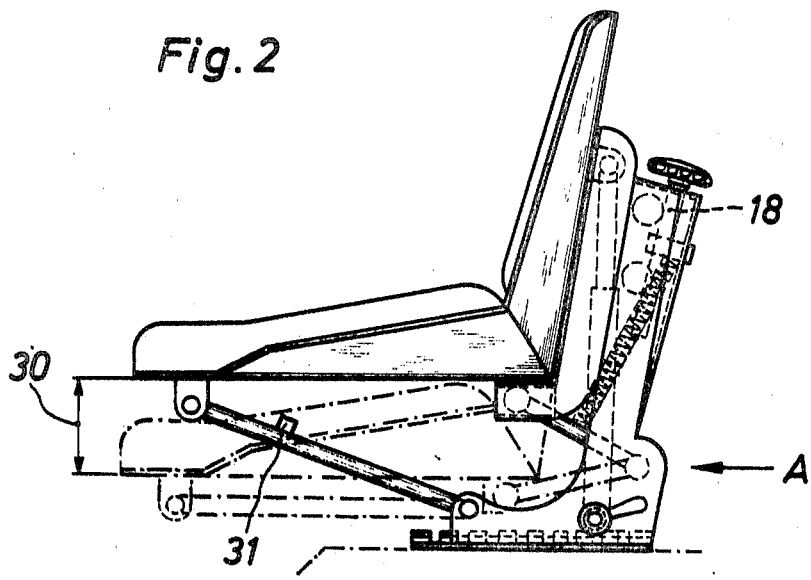
Figure 3:
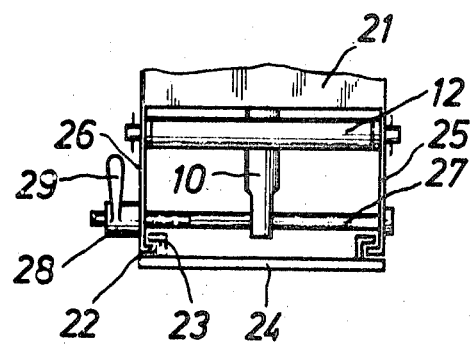
Figure 4:
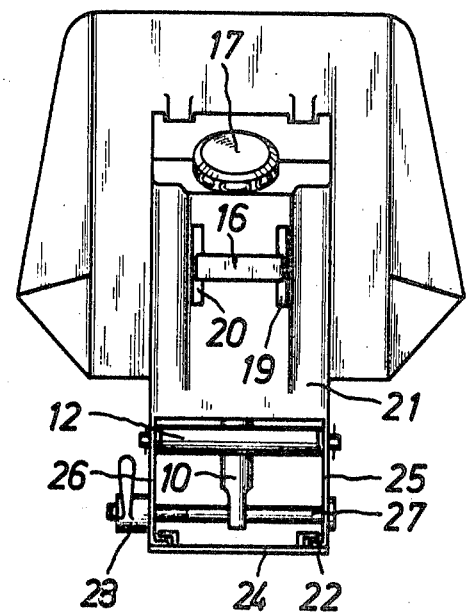

In the following description, an embodiment of the invention will be described by way of example with reference to the drawing, in which:

FIG. 1 is a side elevation showing the seat according to the invention for a vehicle, FIG. 2 illustrates the large spring deflection of a seat according to the invention for a vehicle, FIG. 3 is an elevation from the direction A in FIG. 2, and FIG. 4 is a rear view showing the seat according to the invention for a vehicle.

As is apparent from FIG. 1, the seat for a vehicle comprises an L-shaped carrying frame 1 for the seat upholstery 2 and an L-shaped mounting frame 4, which serves to connect the seat 3 to the vehicle. The rear part 5 of the mounting frame 4 constitutes a track for rollers 6, 7, which are secured to the mounting frame 1. Two main rocker arms are provided under the seat proper 3. Only the main rocker arm is apparent from the drawing. The seat for a vehicle is also provided with a spring mounting which comprises two resilient elements consisting in the present embodiment of coil springs. Only one resilient element 9 is shown in the drawing. The spring mounting comprises also a vibration damper 10.

The main rocker arm 8 is pivoted to the mounting frame 4 and the seat proper 3 at the respective forward ends thereof. The spring mounting elements 9 are pivoted to the rear part 5 of the mounting frame 4 and to a short compensating rocker arm 11. The compensating rocker arm 11 is connected at one end by a pivot 12 to the rear part 5 of the mounting frame and at the other end by a roller 13 to a track 14, which is provided on the generally horizontal part of the carrying frame 1. The lower pivot 15 of the long main rocker arm 8 and the lower pivot 12 of the short compensating rocker arm 11 lie in vertically spaced, horizontal planes and the rocker arms extend at different angles to said planes. When a load is applied to the seat, the angle of the rocker arm 11 approaches that of the rocker arm 8. The compensation is effected by the roller 13 moving along the track 14. The location of the lower pivot 12 of the short compensating rocker arm 11 and the angular adjustment of the resilient elements 9 connected to the compensating rocker arm 11 are selected to provide for a stepped-up, progressive characteristic curve.

The progressive characteristic noted in the preceding paragraph relates to the spring characteristic of the system consisting of the seat, the swing shaft 11 and the spring element 9. By fastening the lower end of the spring to the swing shaft 11, there is a varying force acting on the spring during the swinging process. This force changes during the path of swing of the swing shaft 11 to a given, slight, extent, so that the spring appears stiffer with increasing downward movement of the seat. This type of spring characteristic is, in general, referred to as progressive, and results from the physical arrangement of the elements illustrated in the FIGS.

The spring mounting elements 9 are suspended from a U-shaped support 16 in the rear part of the mounting frame 4. The support 16 is mounted on a screw 18, which is provided with a handle 17 and serves to change the weight setting. As is apparent from FIG. 4, the U-shaped support 16 extends outwardly through gaps 19, 20 left between offset wall sections of the rear part 5 of the mounting frame. That rear part consists of a box 21. Thus, the support 16 prevents an inclination of the spring mounting and serves as a scale for the adjustment. Owing to its boxlike design, the rear part 5 of the mounting frame 4 protects those parts of the seat for a vehicle which are contained in said part 5 from the influence of the weather and from being soiled.

The carrying frame 1 carries pairs of rollers 6, 7, which are guided in tracks carried by the rear part 5 of the mounting frame 4. One pair of rollers is spaced from the track so as to enable a limited resilient movement of the seat for a vehicle in the horizontal direction.

By means of a rail 22, the mounting frame 4 is longitudinally guided in upright toothlike clips 23 provided on a baseplate 24. The mounting frame 4 and the baseplate 24 are clamped together like the jaws of a vise by a rod 27, extending transversely through the lower edges of the mounting frame, which strains the side members 25, 26 of the box 21 of the rear part 5 of the mounting frame 4. The rod 27 is formed at one end with screw threads, to which a locking lever 29 is secured by a cylindrical head member 28. When the lever 29 is screwed onto the rod 27, the lower edges of the mounting frame are passed into the L-shaped rails 22 and are clamped thereto.

As is apparent from FIG. 4, the lower end of the vibration absorber 10 is pivoted to the rod 27 for locking the mounting frame 4 and the baseplate 24.

It is indicated at 30 in FIG. 2 that the driver's seat has a large spring,cushioned stroke of 100 millimeters and a small installation height. The rocker arm 8 carries a rubber buffer 31, which prevents a hard impact at the end of the stroke.

I claim:

1. A vehicle swing seat, particularly for agricultural vehicles, said swing seat comprising: a seat proper; a seat back; a mounting frame extending behind said seat back and substantially parallel thereto, said mounting frame serving to connect the swing seat to its associated vehicles; a plurality of guide elements connected to said seat back; guide track means in said mounting frame for guiding said guide elements during upward and downward movement of said swing seat; a first swing shaft arranged below said seat proper for pivotally connecting the front region of the seat proper to the bottom region of said mounting frame; and a second swing shaft for pivotally connecting the rear region of the seat proper to said mounting frame; at least one spring element, the upper end of which is fastened to said mounting frame and the lower end of which is fastened to said second swing shaft; and a guide path arranged on said seat proper for guiding the end of said second swing shaft associated with the rear region of the seat proper for both rotation and translation.

2. A vehicle swing seat according to claim 1, in which the ends of said first and second swing shafts associated with said mounting frame lie in two horizontal planes, one above the other.

3. A vehicle swing seat according to claim 1, wherein the mounting frame is in the form of a hollow box; and wherein said guide elements are in the form of plastic rollers rotatably connected to said seat back; said hollow box defining the guide track means.

4. A vehicle swing seat according to claim 3, and further comprising an L-shaped frame member for stiffening said seat back, said plastic rollers being rotatably connected to said frame member.

5. A vehicle swing seat according to claim 1, and further comprising a roller rotatably fastened to the end of said second swing shaft associated with said seat proper, said roller adapted to roll in said guide path upon displacement thereof.

6. A vehicle swing seat according to claim 1, and further comprising a U-shaped support provided on the rear side of said mounting frame, the legs of said support extending through a pair of slots defined in said mounting frame and in a direction substantially transverse to the direction of movement of said guide elements, the legs extending into said mounting frame from the rear thereof; a threaded spindle associated with and screwed into said U-shaped support; means for rotating said spindle from outside said mounting frame, thereby screwing same into or out of said support; and means for connecting the upper end of said spring elements to the legs of the U-shaped support.

7. A vehicle swing seat according to claim 1, wherein the lower edges of said mounting frame are bent in an L-shape in a direction towards each other, and further comprising a baseplate where edges define complementary rails, which rails are bent in an L-shape away from each other, the lower edges of said baseplate associated with said rails and being displaceable therein in a longitudinal direction; a threaded rod extending transversely to and connecting the lower edges of said baseplate; and a nut screwed on the threaded rod for clamping the lower edges of the baseplate to the L-shaped rails.